(12) United States Patent
Ota et al.

(10) Patent No.: US 11,919,796 B2
(45) Date of Patent: Mar. 5, 2024

(54) BEND-FORMING DEVICE FOR GLASS PLATE

(71) Applicant: AGC INC., Tokyo (JP)

(72) Inventors: Shinya Ota, Tokyo (JP); Ryota Matsumoto, Tokyo (JP)

(73) Assignee: AGC INC., Tokyo (JP)

( * ) Notice: Subject to any disclaimer, the term of this patent is extended or adjusted under 35 U.S.C. 154(b) by 242 days.

(21) Appl. No.: 17/321,055

(22) Filed: May 14, 2021

(65) Prior Publication Data
US 2021/0276911 A1     Sep. 9, 2021

Related U.S. Application Data

(63) Continuation of application No. PCT/JP2019/045129, filed on Nov. 18, 2019.

(30) Foreign Application Priority Data

Nov. 19, 2018  (JP) ................. 2018-216519

(51) Int. Cl.
*C03B 23/03*      (2006.01)
(52) U.S. Cl.
CPC ......... *C03B 23/03* (2013.01); *C03B 2215/50* (2013.01)
(58) Field of Classification Search
CPC .............................................. C03B 2215/50
See application file for complete search history.

(56) References Cited

U.S. PATENT DOCUMENTS

| 5,833,729 A * | 11/1998 | Meunier ............... C03B 35/145 |
| | | 65/273 |
| 9,896,369 B2 | 2/2018 | Bennett |
| 2003/0106340 A1* | 6/2003 | Nitschke ............... C03B 40/005 |
| | | 65/273 |
| 2004/0094046 A1 | 5/2004 | Aoshima et al. |
| 2004/0107729 A1 | 6/2004 | Fukami et al. |
| 2005/0235698 A1 | 10/2005 | Siskos |
| 2005/0268661 A1 | 12/2005 | Yoshizawa et al. |
| 2015/0315058 A1 | 11/2015 | Ota |

(Continued)

FOREIGN PATENT DOCUMENTS

| CN | 1533365 A | 9/2004 |
| EP | 2 944 617 A1 | 11/2015 |

(Continued)

OTHER PUBLICATIONS

International Searching Authority, "International Search Report," issued in connection with International Patent Application No. PCT/JP2019/045129, dated Dec. 10, 2019.

*Primary Examiner* — Lisa L Herring
(74) *Attorney, Agent, or Firm* — Foley & Lardner LLP

(57) ABSTRACT

An apparatus for bending a glass plate includes a lower ring mold to be disposed under a glass plate and configured to support an edge portion of the glass plate; a plurality of supporting members configured to support the lower ring mold; an upper mold to be disposed above the glass plate and having a downwardly convex forming surface configured to be pressed against the glass plate supported by the lower ring mold; a lower heater configured to heat the lower ring mold; and a spacer attached to the lower ring mold, the spacer configured to control a gap between the upper mold and the lower ring mold.

4 Claims, 8 Drawing Sheets

(56) References Cited

U.S. PATENT DOCUMENTS

| | | | |
|---|---|---|---|
| 2016/0145141 A1* | 5/2016 | Bennett | C03B 27/044 65/103 |
| 2018/0134601 A1 | 5/2018 | Bennett | |
| 2018/0339928 A1 | 11/2018 | Nitschke et al. | |
| 2020/0079676 A1* | 3/2020 | Boisselle | C03B 23/0307 |

FOREIGN PATENT DOCUMENTS

| | | |
|---|---|---|
| JP | H06-009237 A | 1/1994 |
| JP | H07-187692 A | 7/1995 |
| JP | 2004-330289 A | 11/2004 |
| JP | 2007-533592 A | 11/2007 |
| WO | WO-92/01638 A1 | 2/1992 |
| WO | WO-2016/085612 A1 | 6/2016 |
| WO | WO-2017/079251 A1 | 5/2017 |

\* cited by examiner

BEND-FORMING DEVICE FOR GLASS PLATE

CROSS-REFERENCE TO RELATED APPLICATION

This application is a continuation of PCT Application No. PCT/JP2019/045129, filed on Nov. 18, 2019, which is based upon and claims the benefit of priority from Japanese Patent Application No. 2018-216519 filed on Nov. 19, 2018. The contents of those applications are incorporated herein by reference in their entireties.

TECHNICAL FIELD

The present invention relates to an apparatus for bending a glass plate.

BACKGROUND ART

Window glasses for recent buildings and automobiles are required to be formed in various shapes or to have various curvatures in order to meet requirements in terms of design or function. In order to cope with the requirements, glass plates are bent by a bending apparatus. As the apparatus for bending a glass plate, there has been known an apparatus, which presses a glass plate by an upper mold and a lower ring mold.

The apparatus for bending a glass plate disclosed by Patent Document 1 listed below includes an upper mold, a lower flexible ring mold, and a plurality of deformable supporting members which support the lower ring mold along a deformable surface.

The apparatus for bending a glass plate disclosed by Patent Document 2 listed below includes an upper mold, a lower movable ring mold, and heating conductors heating the lower ring mold.

PRIOR ART DOCUMENTS

Patent Documents

Patent Document 1: JP-A-H7-187692
Patent Document 2: JP-A-H6-009237

DISCLOSURE OF INVENTION

Technical Problem

In the apparatus for bending a glass plate disclosed by Patent Document 1, the lower flexible ring mold could cause unintended deformation because of being supported by the deformable supporting members.

In the apparatus for bending a glass plate disclosed by Patent Document 2, the lower ring mold could cause unintended deformation due to thermal expansion because of being heated by the heating conductors.

In each of the apparatuses, when the lower ring mold is deformed, the gap between the upper mold and the lower ring mold fails to maintain a constant value. When the gap fails to maintain a constant value, a glass plate cannot be bent in a desired shape, and the pressing force applied to the glass plate is made uneven from position to position in an in-plane of the glass plate.

The present invention is proposed, taking such circumstances into consideration. It is an object of the present invention to provide an apparatus for bending a glass plate, which is capable of minimizing variations in the gap between an upper mold and a lower ring mold.

Solution to Problem

The apparatus for bending a glass plate according to one mode of the present invention includes a lower ring mold to be disposed under a glass plate and configured to support an edge portion of the glass plate; a plurality of supporting members configured to support the lower ring mold; an upper mold to be disposed above the glass plate and having a downwardly convex forming surface configured to be pressed against the glass plate supported by the lower ring mold; a lower heater configured to heat the lower ring mold; and a spacer attached to the lower ring mold, the spacer configured to control the gap between the upper mold and the lower ring mold.

Advantageous Effects of Invention

The present invention can minimize variations in the gap between an upper mold and a lower ring mold and bend a glass plate with high precision.

DESCRIPTION OF EMBODIMENTS

Figure 1:
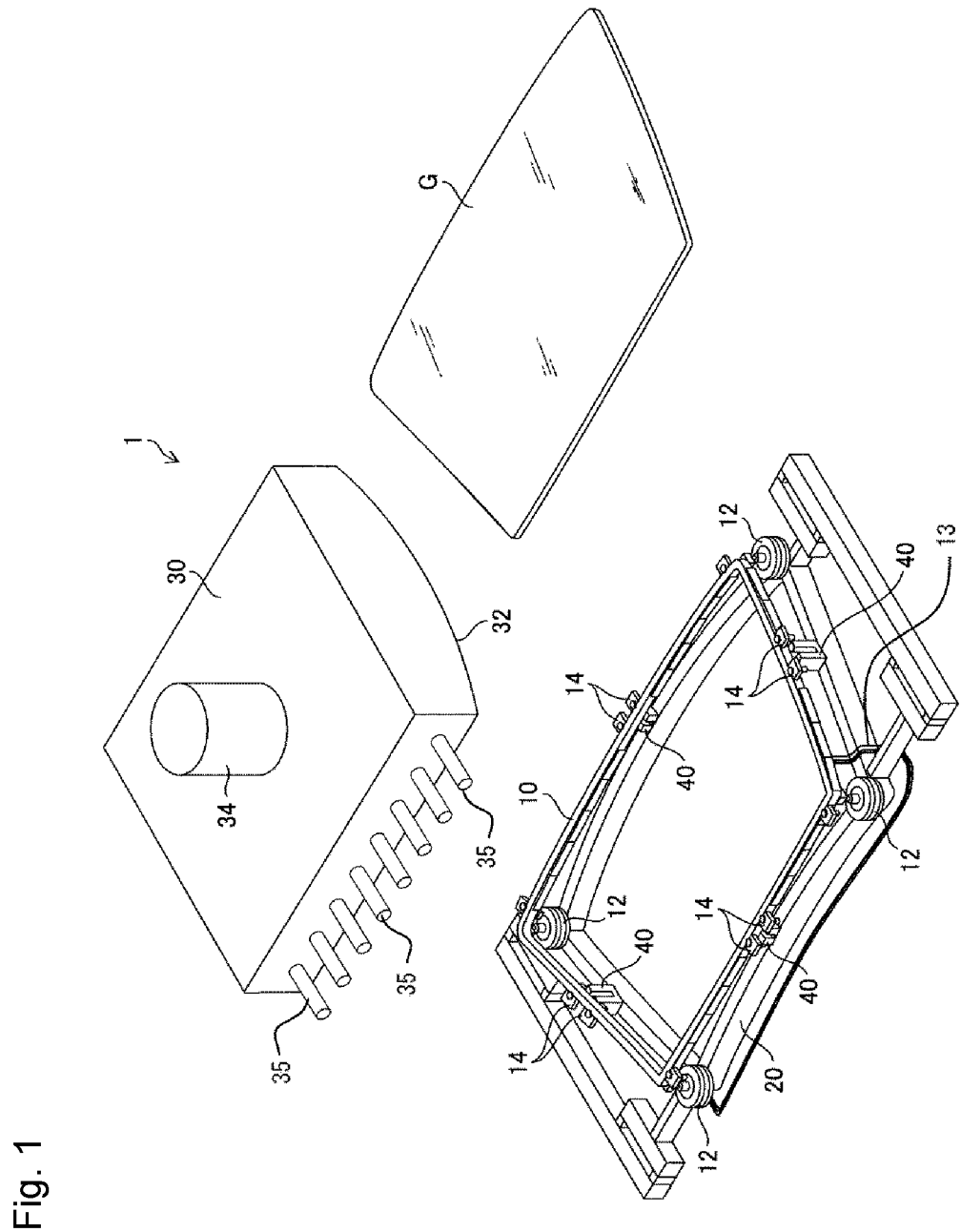
FIG. 1 is a schematic perspective view of the apparatus for bending a glass plate according to an embodiment of the present invention.

Now, an embodiment of the present invention will be described in reference to the accompanying drawings. The present invention will be described based on the embodiment described below. It should be noted that numerous modifications and variations of the present invention are possible in light of the disclosure without departing from the scope of the present invention, and that the present invention may be practiced by other embodiments than the embodiment that is described below. From this point of view, any modifications within the scope of the present invention are included in the scope of the appended claims. Now, a mode wherein the present invention is implemented will be described in reference to the accompanying drawings. In the drawings, identical members or elements are denoted by like references, and overlapping explanation of such members or elements will be avoided in some cases. In Description, when numerical ranges are represented by the term "to", the values representing the upper limits and the lower limits before and after the term are included in the relevant numerical ranges. In Description, the terms "upward" and "downward" are used with respect to the gravitational direction. The gravitational direction and the antigravitational direction with respect to a reference are defined as "downward" and "upward", respectively.

Now, the apparatus for bending a glass plate according to a preferred mode of the embodiment of the present invention will be described in reference to the accompanying drawings.

<Apparatus for Bending Glass Plate>

FIG. 1 is a schematic perspective view illustrating the apparatus for bending a glass plate according to the embodiment. As shown in FIG. 1, the apparatus for bending a glass plate 1 includes a lower ring mold 10 and an upper mold 30. The lower ring mold 10 supports an edge portion of a glass plate G. The upper mold 30 includes a downwardly convex forming surface 32, which is configured to be pressed against substantially one full surface of a glass plate G. There is no limitation to the shape of the forming surface 32 so long as the forming surface can bend a glass plate G in a required shape.

The forming surface 32 of the upper mold 30 is formed in a curved surface shape to be curved toward the lower ring mold 10. A flat glass plate G is bent in a desired shape along the curved surface shape of the forming surface 32. The upper mold 30 includes upper heaters 35. The upper heaters 35 can heat the forming surface 32 in a temperature range of, e.g., 350° C. to 550° C.

The upper mold 30 is formed in a hollow structure, for example. The upper mold 30 includes a duct 34 communicating with an inner space of the hollow structure. The duct 34 is connected to an unshown suction fan. The forming surface 32 has a plurality of apertures (not shown) formed therein so as to communicate with the inner space of the hollow structure. The forming surface 32 can suck a glass plate G by a suction force produced by the suction fan and hold the suction state.

The lower ring mold 10 supports an edge portion of a glass plate G from a lower side of the glass plate. As shown in FIG. 1, the lower ring mold 10 is an annular member formed along the profile of a glass plate G. The lower ring mold 10 does not support a glass plate G except for the edge portion of the glass plate G. The lower ring mold 10 includes a lower heater 13. The lower ring mold 10 can have a glass plate supporting surface heated in a temperature range of, e.g., 350° C. to 600° C. by the lower heater 13. The lower ring mold 10 according to the embodiment is formed by four sides. The lower ring mold 10 includes a corner portion at a position where adjacent sides forming the lower ring mold are connected together. It should be noted that there is no particular limitation to the number of the sides or corner portions of the lower ring mold 10. The lower ring mold 10 is preferably formed in a polygonal shape having at least three corner portions as viewed in plan view, in accordance with the shape of a glass plate G.

Figure 6:
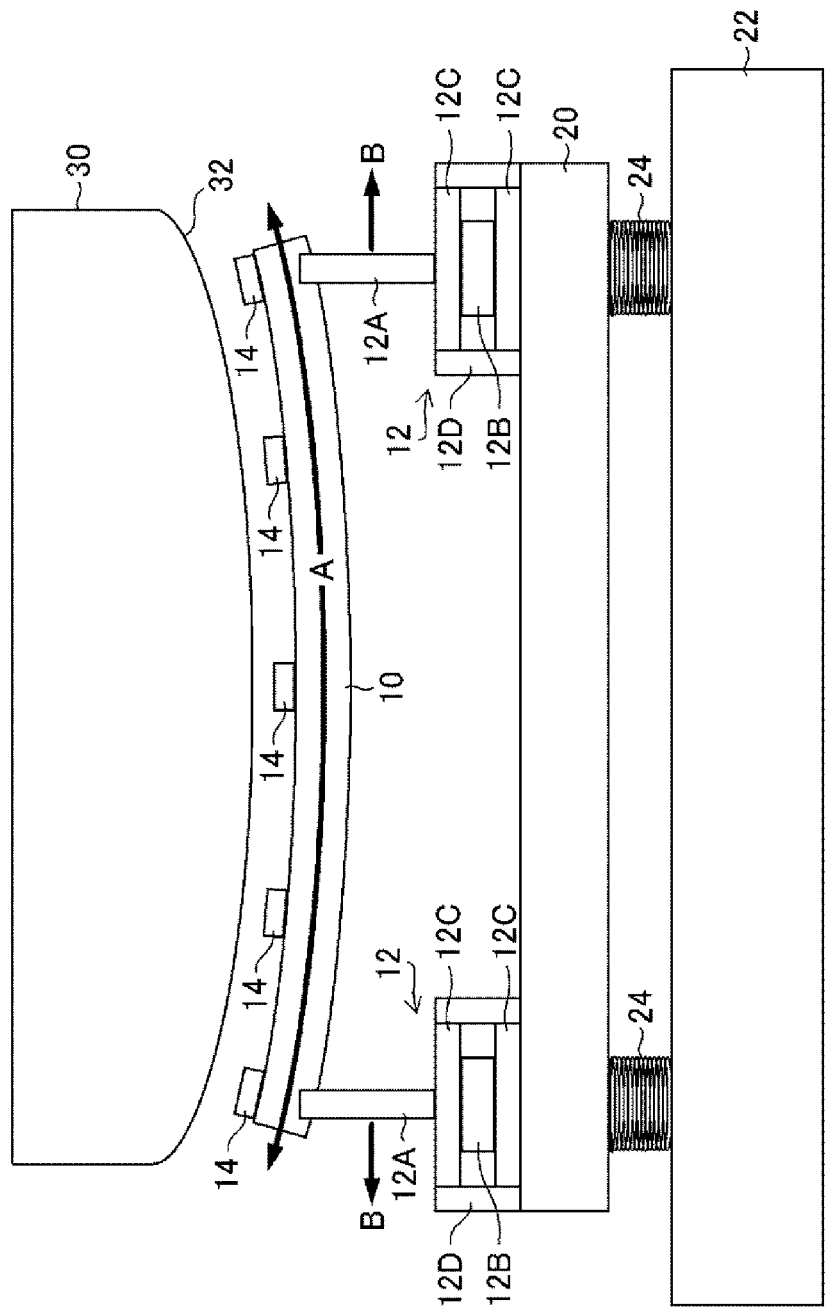
FIG. 6 is a schematic front view of the apparatus for bending a glass plate.

It should be noted that the upper heaters 35 and the lower heater 13 are not shown in FIG. 6 for simple representation.

The upper mold 30 and the lower mold 10 are disposed so as to be opposed. The upper mold 30 and the lower mold 10 are formed in mutually complementary shapes. The upper mold 30 and the lower mold 10 are formed in shapes conforming to the thickness and a desired bent shape of a glass plate G. When the lower ring mold 10 and the upper mold 30 move in a direction to relatively approach each other with the lower ring mold 10 supporting a glass plate G, the glass plate G is bent by pressing. In order to bend a glass plate G by pressing, the gap between the lower ring mold 10 and the upper mold 30 is determined in consideration of the thickness of the glass plate G.

In the embodiment, the lower ring mold 10 is heated by the lower heater 13. The lower ring mold 10, thus heated, reduces a temperature drop in an edge portion of a glass plate G when the lower ring mold 10 supports the edge portion of the glass plate G. This is helpful to decrease an internal stress caused in the edge portion of the glass plate G, for example, to at most 10 MPa, preferably at most 7 MPa.

As shown in FIG. 1, the apparatus for bending a glass plate 1 includes a plurality of supporting members 12 supporting the lower ring mold 10. In the embodiment, the respective supporting members 12 are disposed in the respective corner portions of the lower ring mold 10. There is no particular positional arrangement of the supporting members 12 so long as the supporting members can support a glass plate G, dispersing a pressing force from the upper mold 30 when pressing the glass plate G. The supporting members 12 may be disposed only at the corner portions or may be additionally disposed between corner portions. In Description, the wording "corner portions" includes an area adjacent thereto.

Each of the plurality of supporting members 12 disposed at the corner portions has a first end connected to the lower ring mold 10 and a second end connected to a base 20, which supports the plurality of supporting members 12. Each of the plurality of supporting members 12 disposed at the corner portions has a fixed height from the base 20 to the lower ring mold 10. This means that the height of the plurality of supporting members makes no change when a glass plate G is pressed against the upper mold 30. The supporting members 12 having a fixed height prevent the lower ring mold 10 from being significantly deformed. In order to equalize the height levels of the corner portions, the supporting members 12 have a fixed height and are configured to be capable of height adjustment. The height adjustment may be made by at least one of screw adjustment and/or insertion of a shim under a supporting member 12.

In contrast, the plurality of supporting members that are disposed between the corner portions may be height-variable supporting members. In summary, the supporting members 12 disposed at the corner portions are of a height-fixed type while the supporting members disposed between the corner portions may be of a height-variable type. For example, the height-variable type of supporting members may be of a spring-type structure including an elastic member, such as a spring. Since each of the height-variable type of supporting members includes the elastic member, such as a spring, the height of the height-variable type of supporting members disposed between the corner portions can be changed in conformity with deformation of the lower ring mold 10 during pressing a glass plate G against the upper mold 30.

When the plurality of supporting members 12 disposed at the corner portions are of a height-fixed type while the supporting members disposed between the corner portions are of a height-variable type, the lower ring mold 10 can be configured such that the height at each of the corner portions makes no change while the height between the corner portions can make a change in conformity with deformation of the lower ring mold 10. This arrangement can support a glass plate G, dispersing a pressing force from the upper mold 30 when pressing the glass plate G.

The apparatus for bending a glass plate 1 includes the base 20, which is formed in a ring shape to support the supporting members 12. The base 20 has elastic members 24 (see FIGS. 6 and 7) disposed thereunder.

The apparatus for bending a glass plate 1 according to this embodiment has a plurality of spacers 14 attached to an outer peripheral side of the lower ring mold 10 so as to be replaceable.

The apparatus for bending a glass plate 1 includes a plurality of guides 40, which regulate a deformation direction of the lower ring mold 10. The guides 40 are disposed between the plurality of supporting members 12 and preferably at a middle position of each of the sides forming the lower ring mold 10. A phantom line connecting between the guides 40 disposed on a pair of opposed sides and a phantom line connecting between the guides 40 disposed on another pair of opposed sides meet at one point. The intersection of the two phantom lines is located at the gravity center position of the lower ring mold 10.

Figure 2:
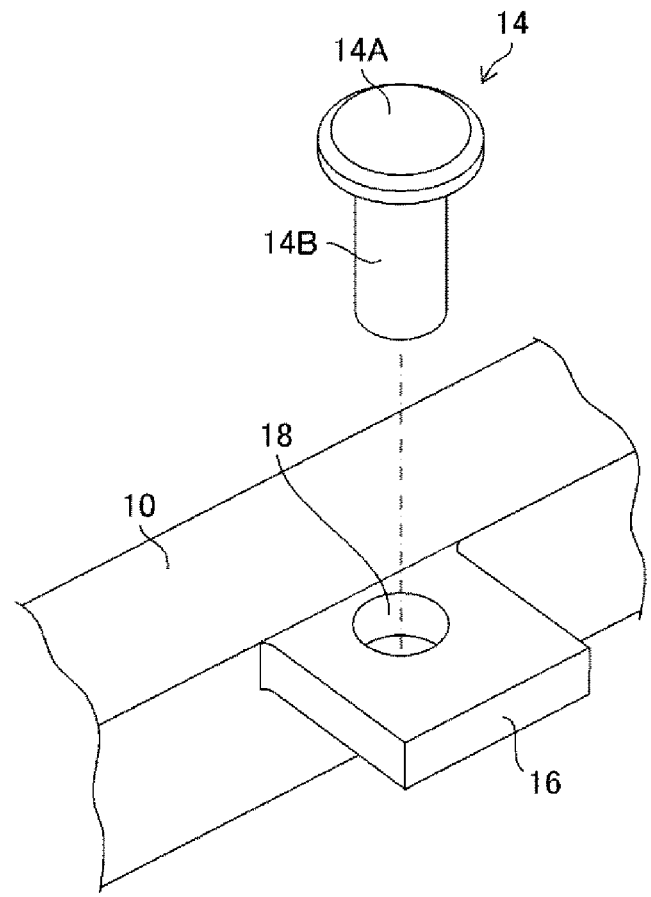
FIG. 2 is an enlarged perspective view of an assembled portion of a lower ring mold of the apparatus for bending a glass plate.
Figure 2:
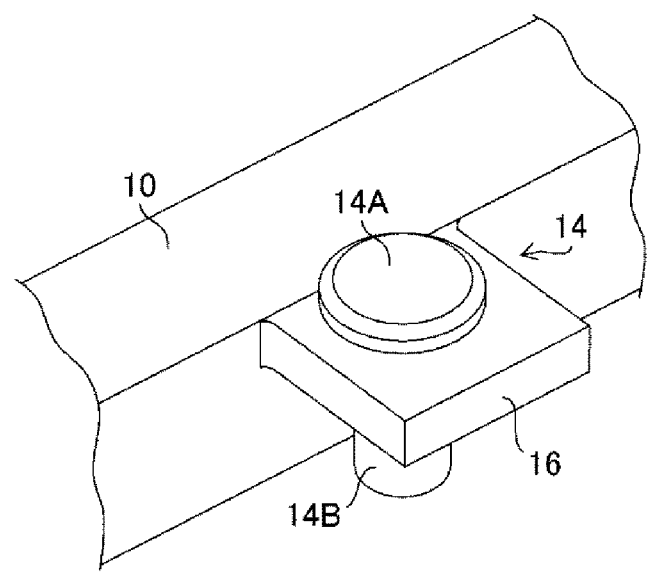

FIG. 2 is an enlarged perspective view of an assembled portion of the lower ring mold 10 where a spacer 14 is assembled. As shown in FIG. 2, each spacer 14 includes a head 14A formed in a circular plate shape, and a shaft 14B formed in a column shape and extending from a central portion of the head 14A perpendicularly to the head 14A. The lower ring mold 10 has holders 16 disposed on the outer peripheral side such that each holder has a through hole 18 formed therein. The lower ring mold 10 and the holders 16 may be formed as one unit. Alternatively, the lower ring mold 10 and the holders 16 may be separately formed and be fixed together by welding.

The shaft 14B of each spacer 14 is inserted into the through hole 18 of its corresponding holder from upward. Thus, the head 14A of each spacer 14 is brought into contact with its corresponding holder 16, and each spacer 14 is attached to its corresponding holder 16.

Each holder 16 has a top surface formed so as to be substantially flush with a top surface of the lower ring mold 10. By this arrangement, the heads 14A of the spacers 14 protrude upward from the top surface of the lower ring mold 10.

When a spacer 14 is not firmly fixed (for example, welded) to its corresponding holder 16, the spacer 14 can be easily removed from the lower ring mold 10.

For example, the shaft 14B of each spacer 14 protrudes downwardly from the through hole 18 of its corresponding holder 16 as shown in FIG. 2. When a force is applied to the shaft 14B of each spacer 14 toward upward from downward, each spacer 14 can be easily removed from its corresponding holder 16. It should be noted that the attachment of the spacers 14 to the lower ring mold 10 is not limited to the one mentioned above. Each spacer 14 may be attached to its corresponding holder 16 by welding.

Figure 3:
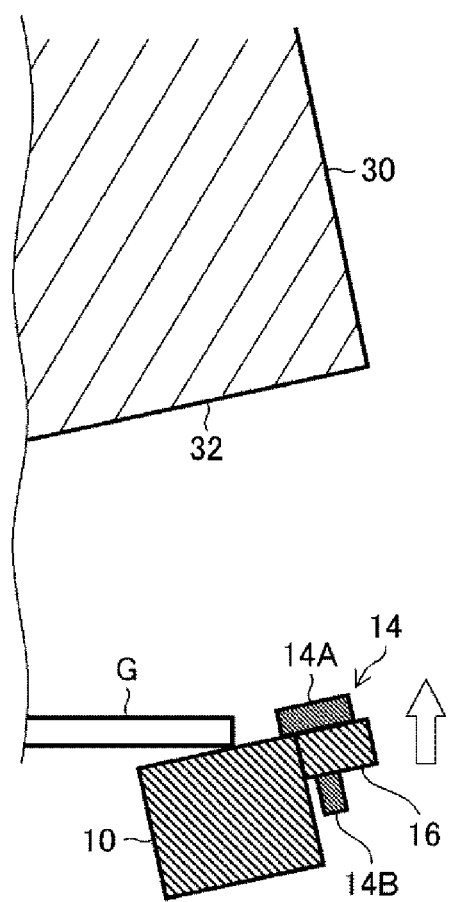
FIG. 3 is an explanatory diagram illustrating an operation of the apparatus for bending a glass plate.
Figure 4:
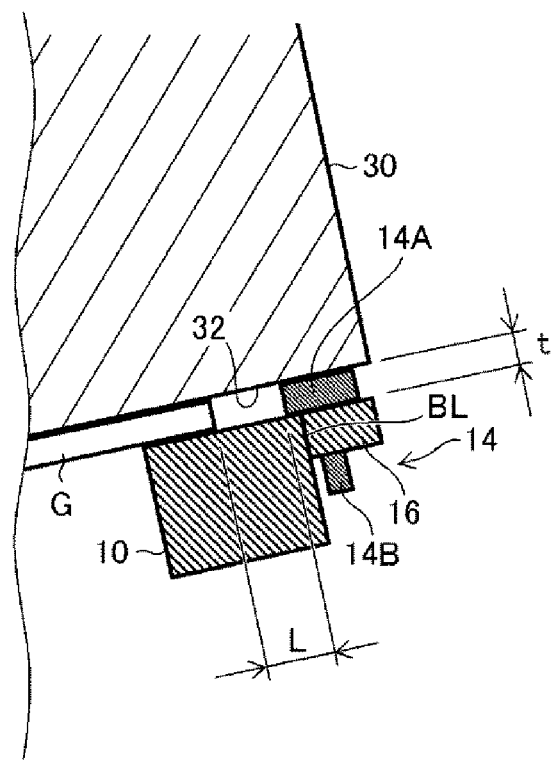
FIG. 4 is an explanatory diagram illustrating the operation of the apparatus for bending a glass plate.
Figure 5:
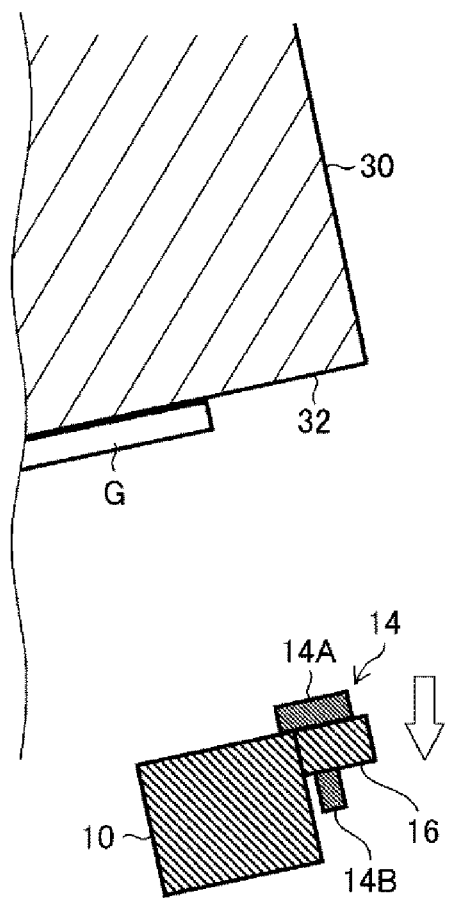
FIG. 5 is an explanatory diagram illustrating the operation of the apparatus for bending a glass plate.

FIGS. 3 to 5 are explanatory diagrams illustrating an operation of the apparatus for bending a glass plate. As described above, what is important when a glass plate G is bent is to minimize variations in the gap between the lower ring mold 10 and the upper mold 30 during pressing.

As shown in FIG. 3, the lower ring mold 10 and the upper mold 30 are disposed, being spaced from each other by a distance that allows a glass plate G to be accepted therebetween. The glass plate G is conveyed in between the lower ring mold 10 and the upper mold 30 by an unshown conveyor. Before being conveyed to the apparatus for bending a glass plate 1, the glass plate G is heated to a temperature suitable to bending by a furnace (not shown). The glass plate G is heated in a range of 620° C. to 690° C. in the furnace. The glass plate G thus conveyed has an edge portion supported from below by the top surface of the lower ring mold 10. The lower ring mold 10 and the upper mold 30 move in the direction to relatively approach each other. In this embodiment, the lower ring mold 10 moves toward the upper mold 30. It should be noted that the apparatus for bending a glass plate 1 may be installed outside the furnace or in the furnace.

As shown in FIG. 4, the lower ring mold 10 moves toward the upper mold 30 to bring the forming surface 32 of the upper mold 30 into contact with the heads 14A of the spacers 14. The spacers 14 regulate the movements of the lower ring mold 10 and the upper mold 30. Since the movements are regulated, the gap t between the lower ring mold 10 and the upper mold 30 can be controlled by the spacers 14 to minimize variations in the gap t. The spacers 14 make the gap t constant such that the lower ring mold 10 assumes a shape following the forming surface 32 of the upper mold 30. Thus, the apparatus for bending a glass plate 1 according to the embodiment can bend a glass plate G with high precision. The gap t between the lower ring mold 10 and the upper ring mold 30 generates a force to bend a glass plate G. The gap t can vary to control the force to bend a glass plate G.

The edge portion of a glass plate G is spaced from the spacers 14 by a distance L of preferably at least 3 mm and at most 30 mm. When the distance L is set to at least 3 mm, the contact of the glass plate G with a spacer 14 during bending can be avoided to reduce the occurrence of damage to the glass plate G. When the distance L is set to at most 30 mm, the upper mold 30 is prevented from becoming excessively larger than the lower ring mold 10. Thus, the apparatus for bending a glass plate 1 can be made smaller.

The gap t between the lower ring mold 10 and the upper mold 30 is controlled by the thickness of the heads 14A of the spacers 14. For example, it is preferred that plural kinds of spacers 14, which include heads 14A having different thicknesses from kind to kind, be prepared, and that one kind of spacers 14 are replaced with a suitable kind of spacers according to the thicknesses of glass plates G. Thus, the apparatus for bending a glass plate 1 can cope with bending glass plates G having different thicknesses.

The relationship between the thickness of a glass plate G and the thickness of the heads 14A of the spacers 14 is preferably determined that the thickness of the glass plate G is at least 70% and at most 130% of the head thickness of the spacers 14. This means that a single kind of spacers 14 can cope with glass plates G having different thicknesses. Since a single kind of spacers can cope with glass plates G having different thicknesses, the replacement frequency of the spacers 14 can be reduced. It should be noted that the thickness of the glass plate G is at least 85% and at most 115% of the head thickness.

As shown in FIG. 4, each spacer 14 is disposed at a position across a boundary BL between its corresponding holder 16 and the lower ring mold 10. The pressing force applied from the upper mold 30 can be supported by the lower ring mold 10 and the holders 16 through the spacers 14. Thus, the holders 16 can be prevented from being broken by avoiding a case where the pressure from the upper mold 30 is received only by the holders 16.

When the bending of a glass plate G is finished, the lower ring mold 10 moves in a direction away from the upper ring mold 30 as shown in FIG. 5. A bent glass plate G is still vacuum-sucked by the upper mold 30. Subsequently, the suction is released, and the glass plate G is conveyed to a downstream process by an unshown conveyor.

There is no particular limitation to the shape of the spacers 14 so long as the gap t between the lower ring mold 10 and the upper mold 30 can be controlled. For example, each of the heads 14A is formed in a rectangular shape as viewed from upward. Each of the spacers 14 may dispense with the shaft 14B so long as each of the spacers can be attached to the lower ring mold 10.

The spacers 14 may be attached to the outer peripheral side of the lower ring mold 10 with a uniform pitch in a range of 100 mm to 300 mm. The attachment of the spacers may be made with nonuniform pitches in a range of 50 mm to 600 mm.

A glass plate G to be bent is a glass plate formed in a planar shape by, e.g., a float process or fusion process. The glass plate may be made of inorganic glass. The glass plate may be made of soda lime glass, aluminosilicate glass, or alkali-free glass. When the glass plate is made of soda lime glass, the glass plate may be made of green glass or clear glass.

A glass plate G to be bent has a thickness of preferably from 1 mm to 5 mm. It should be noted that there is no particular limitation to the thickness of the glass plate G. There is also no particular limitation to the size of the glass plate G.

The apparatus for bending a glass plate 1 can not only bend a single glass plate G but also simultaneously bend a glass plate G having at least two glass plate layers laminated therein.

Figure 7:
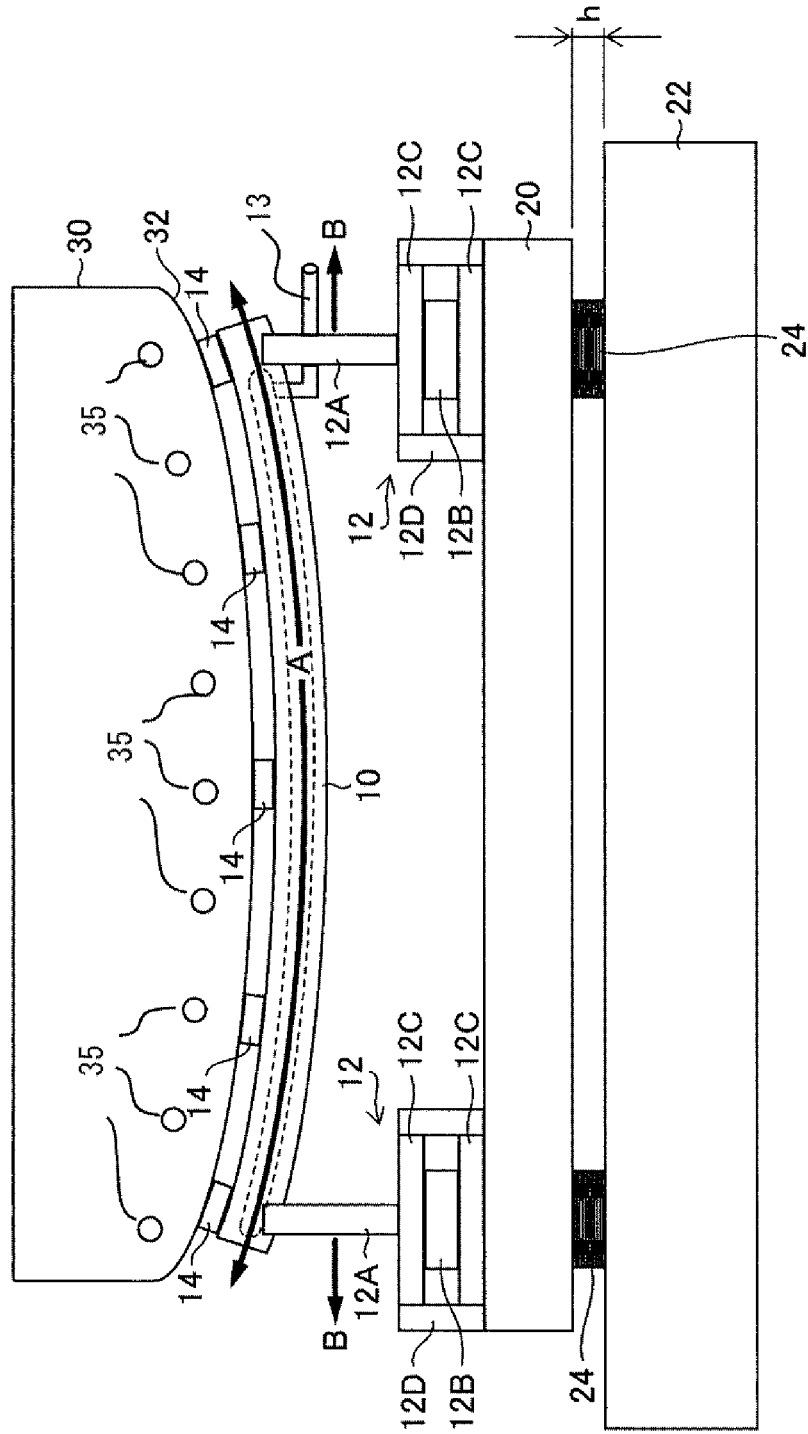
FIG. 7 is a schematic front view of the apparatus for bending a glass plate.

Next, FIGS. 6 and 7 are schematic front views of the apparatus for bending a glass plate 1. In FIGS. 6 and 7, the plurality of supporting members 12 are depicted so as to illustrate their internal structures. A glass plate G is not shown in order to readily understand the operation of the apparatus. As shown in FIG. 6, the plural supporting members 12 support the lower ring mold 10 from downward. Each of the supporting members 12 includes a stem 12A coupled to the lower ring mold 10, a disc-shaped slider 12B attached to a lower portion of the stem 12A, two slider plates 12C sandwiching the slider 12B from both upper and lower sides, and a slider case 12D housing the slider plates 12C. The slider 12B can move in a hollow space formed by the two slider plates 12C and the slider case 12D, and move on a horizontal surface of the lower slider plate 12C. The stem 12A connected to the slider 12B moves, accompanying the movement of the slider 12B. Each of the slider assembly in this embodiment is formed of the slider 12B, the two slider plates 12C and the slider case 12D. It should be noted that the slider assemblies are not limited to have this structure.

The operation of the supporting members 12 having their corresponding slider assembly will be described. As described above, the lower ring mold 10 is heated by the lower heater. The respective sides of the lower ring mold 10 are extended along a longitudinal direction indicated by arrows A due to thermal expansion caused by the heating. The supporting members 12 having their corresponding slider assembly move in directions indicated by arrows B, following the thermal expansion of the lower ring mold 10. The supporting members 12 having their corresponding slider assembly control the deformation of the lower ring mold 10, reducing the occurrence of unintended deformation.

As shown in FIG. 6, the apparatus for bending a glass plate 1 includes a press machine 22 under the base 20. The press machine 22 vertically moves the base 20. The apparatus for bending a glass plate 1 according to this embodiment includes the elastic members 24 under the base 20 and on the press machine 22, i.e., between the base 20 and the press machine 22. The elastic members 24 urge the base upward.

Next, the press machine 22 moves the base 20 toward the upper mold 30 as shown in FIG. 7. Thus, the lower ring mold 10 approaches the upper mold 30. The forming surface 32 of the upper mold 30 is brought into contact with the spacers 14. The press machine 22 moves the base 20 toward the upper mold 30 until the elastic members 24 are compressed to reach a preset height h.

In the apparatus for bending a glass plate 1, the height h of the elastic members 24 is detected by an unshown measuring instrument. When the elastic members reach the preset height h, the upward movement of the lower ring mold 10 stops. The elastic members 24 are compressed not only to maintain an applied force at a constant value during bending a glass plate, but also to prevent the lower ring mold 10 and the press machine 22 from being broken.

Figure 8:
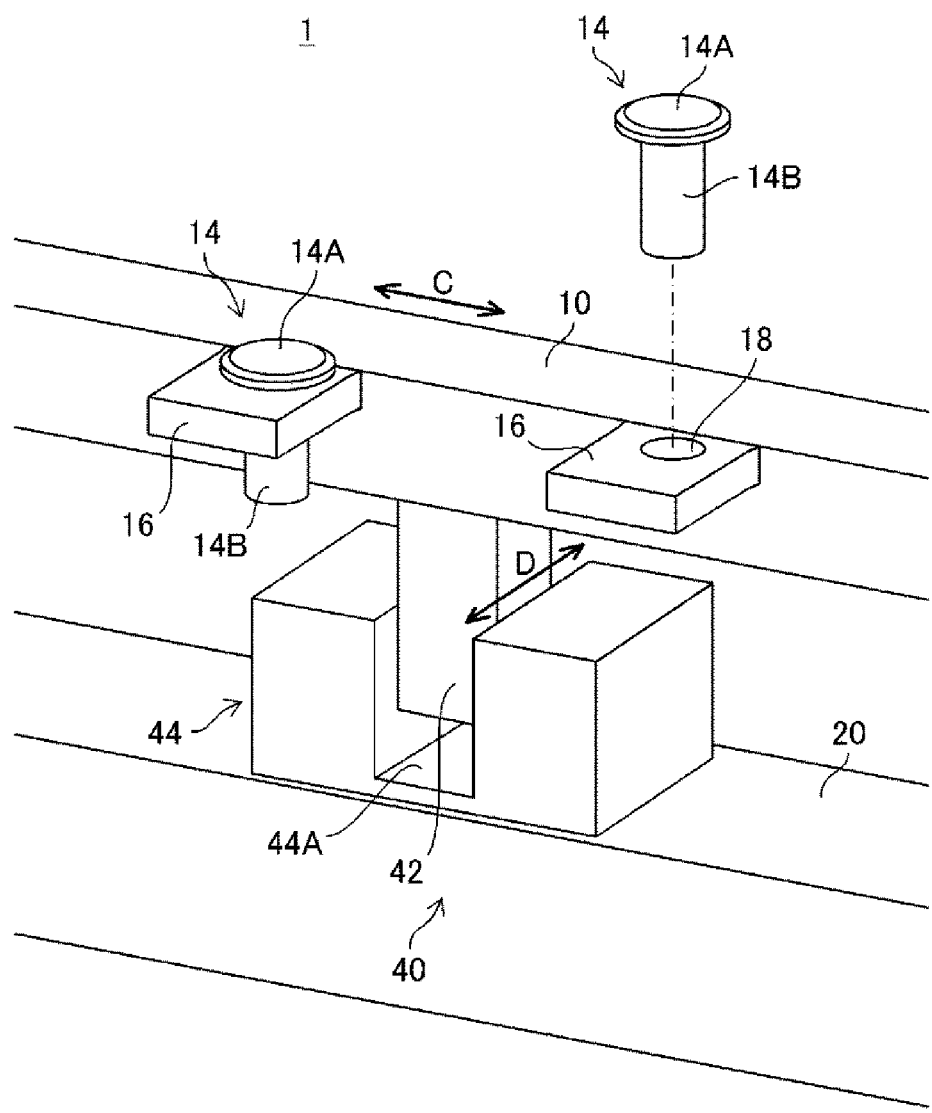
FIG. 8 is an enlarged perspective view of a guide in the apparatus for bending a glass plate.

FIG. 8 is an enlarged view of a guide 40. As shown in FIG. 8, each of the guides 40 includes a post 42 extending downwardly from a central portion a side of the lower ring mold 10, and a U-shaped receiver 44 disposed on the base 20. The post 42 is inserted into the receiver 44 through an opening of a groove 44A formed in the receiver 44.

The operation of the guides 40 will be described. In each of the guides, the groove 44A of the U-shaped receiver 44 is formed in a direction orthogonal to the longitudinal direction of the corresponding side of the lower ring mold 10 indicated by arrows C. The receiver 44 allows the received post 42 to move in a direction along the groove 44A, indicated by arrows D. In contrast, the receiver 44 regulates the movement of the corresponding post 42 in the longitudinal direction of the corresponding side of the lower ring mold 10 indicated by the arrows C. Each of the guides 40 regulates the deformation of the lower ring mold 10 along the longitudinal direction of the corresponding side of the lower ring mold 10 and allows the deformation of the lower ring mold 10 in the direction orthogonal to the corresponding side when the lower ring mold 10 is deformed by thermal expansion. Even when the lower ring mold 10 is deformed by thermal expansion, the guides 40 regulate the deformation directions of the lower ring mold 10. The guides 40 also reduces changes in the gravity position of the lower ring mold 10.

EXPLANATION OF REFERENCE SYMBOLS

1: Apparatus for bending, 10: Lower ring mold, 12: Supporting member, 12A: Stem, 12B: Slider, 12C: Slider plate, 12D: Slider case, 14: Spacer, 14A: Head, 14B: Shaft, 16: Holder, 18: Through hole, 20: Base, 22: Press machine, 24: Elastic member, 30: Upper mold, 32: Forming surface, 34: Duct, 40: Guide, 42: Post, 44: Receiver, 44A: Groove

What is claimed is:

1. An apparatus for bending a glass plate, comprising:
a lower ring mold to be disposed under a glass plate and configured to support an edge portion of the glass plate;
a plurality of supporting members configured to support the lower ring mold;
an upper mold to be disposed above the glass plate and having a downwardly convex forming surface configured to be pressed against the glass plate supported by the lower ring mold;
a lower heater configured to heat the lower ring mold; and
a spacer attached to the lower ring mold, the spacer configured to control a gap between the upper mold and the lower ring mold,
wherein:
the lower ring mold is formed in a polygonal shape having at least three corner portions as viewed in plan view, and the plurality of supporting members are disposed at the corner portions of the lower ring mold;

each of the plurality of supporting members disposed at the corner portions has a first end connected to the lower ring mold and a second end connected to a base configured to support the plurality of supporting members, and each of the plurality of supporting members has a fixed height from the base to the lower ring mold; and sliders are disposed at respective positions where the plurality of supporting members are connected to the base, the sliders allowing the plurality of supporting members to move in an in-plane direction as viewed in plan view.

2. The apparatus according to claim 1, further comprising a press machine disposed under the base, wherein an elastic member is disposed between the base and the press machine to urge the lower ring mold toward upward.

3. The apparatus according to claim 1, wherein the lower ring mold comprises a guide disposed between the plurality of supporting members, the guide regulating a deformation direction of the lower ring mold.

4. The apparatus according to claim 1, wherein the upper mold comprises an upper heater, the upper heater heating the upper mold.

\* \* \* \* \*